(12) United States Patent
Stokes et al.

(10) Patent No.: US 11,843,630 B2
(45) Date of Patent: Dec. 12, 2023

(54) NANON SUPPORT FOR ANTIVIRUS JOBS IN CLUSTERED STORAGE

(71) Applicant: EMC IP Holding Company LLC, Hopkinton, MA (US)

(72) Inventors: Terry Stokes, Lake Forest Park, WA (US); Teng Hong, Shanghai (CN); Antony Richards, Rose Bay (AU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 176 days.

(21) Appl. No.: 17/225,686

(22) Filed: Apr. 8, 2021

(65) Prior Publication Data
US 2022/0329607 A1    Oct. 13, 2022

(51) Int. Cl.
*H04L 9/40*        (2022.01)
*H04L 67/566*      (2022.01)

(52) U.S. Cl.
CPC ............ *H04L 63/145* (2013.01); *H04L 63/08* (2013.01); *H04L 67/566* (2022.05)

(58) Field of Classification Search
CPC ..... H04L 63/145; H04L 63/08; H04L 67/566; H04L 63/104
See application file for complete search history.

(56) References Cited

U.S. PATENT DOCUMENTS

| | | | | |
|---|---|---|---|---|
| 8,370,943 B1* | 2/2013 | Dongre | .................... | G06F 9/505 |
| | | | | 726/25 |
| 2005/0273853 A1* | 12/2005 | Oba | ........................ | H04L 63/20 |
| | | | | 726/22 |
| 2007/0168547 A1* | 7/2007 | Krywaniuk | .......... | H04L 63/0227 |
| | | | | 709/238 |
| 2008/0259917 A1* | 10/2008 | Hua | ....................... | H04L 47/125 |
| | | | | 370/389 |
| 2013/0179972 A1* | 7/2013 | Coronado | ............. | G06F 21/567 |
| | | | | 726/24 |
| 2017/0339180 A1* | 11/2017 | Klein | ....................... | G06F 21/57 |
| 2018/0158019 A1* | 6/2018 | Vutukuri | ................. | H04W 4/35 |

* cited by examiner

*Primary Examiner* — Bryan Y Lee
(74) *Attorney, Agent, or Firm* — Amin, Turocy & Watson, LLP

(57) ABSTRACT

Techniques can be implemented to provide for antivirus scanning in clustered storage where not all nodes of the cluster are connected to an antivirus server. A first computing node of computing nodes of a computing cluster can determine a status of an antivirus server. The first computing node can send a first indication of the status of the antivirus server to a group management protocol service of the computing cluster. The group management protocol service can send a second indication of whether the first computing node is available for antivirus scanning to a job engine of the computing cluster. The job engine can distribute an antivirus job among the computing nodes based on whether the first computing node is available for the antivirus scanning.

20 Claims, 12 Drawing Sheets

NANON SUPPORT FOR ANTIVIRUS JOBS IN CLUSTERED STORAGE

BACKGROUND

A computing cluster can comprise a plurality of computers (which can be referred to as nodes). The nodes of a computing cluster can be configured to provide a unified set of computing resources to a user of a cluster. For example, where the computing cluster provides computing storage resources, data stored within one name space or object space can be distributed across multiple nodes of the cluster.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. A first computing node of computing nodes of a computing cluster can determine a status of an antivirus server. The first computing node can send a first indication of the status of the antivirus server to a group management protocol service of the computing cluster. The group management protocol service can send a second indication of whether the first computing node is available for antivirus scanning to a job engine of the computing cluster. The job engine can distribute an antivirus job among the computing nodes based on whether the first computing node is available for the antivirus scanning.

An example method can comprise determining, by a first node of nodes of a computing cluster, a status of an antivirus server. The method can further comprise sending, by the first node, an indication of the status of the antivirus server to a group management protocol service of the computing cluster. The method can further comprise sending, by the group management protocol service, an indication of whether the first node is available for antivirus scanning to a job engine service of the computing cluster. The method can further comprise distributing, by the job engine service, an antivirus job among the nodes based on whether the first node is available for the antivirus scanning.

An example non-transitory computer-readable medium can comprise instructions that, in response to execution, cause a system comprising a processor to perform operations. These operations can comprise determining, by a first computing node of computing nodes of a computing cluster, a status of a device that is external to the computing cluster. The operations can further comprise sending, by the first computing node, an indication of the status of the device to a group management protocol service of the computing cluster. The operations can further comprise sending, by the group management protocol service, an indication of whether the first computing node is available to perform processing that involves communicating with the device to a job engine service of the computing cluster. The operations can further comprise distributing, by the job engine service, a processing task among the computing nodes based on whether the first computing node is available to perform the processing.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
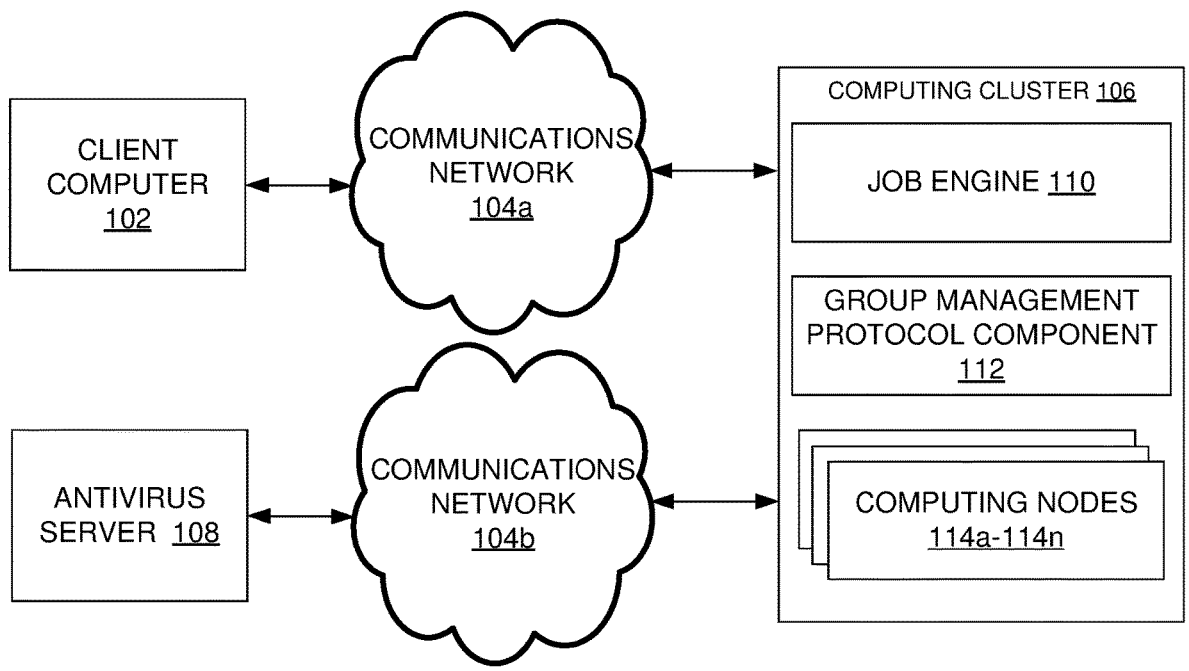
FIG. 1 illustrates an example system architecture that can facilitate not all nodes on network (NANON) support for antivirus jobs in clustered storage, in accordance with certain embodiments of this disclosure.

A computer cluster can comprise multiple computer nodes that are connected to each other via a back-end network. In some examples, the nodes in the cluster can be connected to the same front-end network(s). In some examples, some nodes are not connected to the front-end network or are connected to only part of the front-end networks. In that case, some nodes can still communicate with each other over the back-end network, but are not configured to access external resources.

In some examples, NANON does not affect on-demand scanning and manual scanning, because NANON nodes are inaccessible to server message block (SMB) clients through a front-end network. In some examples, as long as a node has front-end connectivity and is connected to an antivirus server, on-demand and manual scanning can work.

In some examples, NANON nodes affect scheduled scanning, which can be implemented via a job engine. A problem for a job engine can be that job tasks are distributed to multiple nodes via a back-end network, so parts of the job run on multiple nodes in parallel. Nodes running an antivirus job can be configured to communicate with antivirus servers through a front-end network. So, if NANON nodes were used, the scanning requests could fail, and the corresponding files would not be scanned. A solution can be to detect which nodes lack a connection to the antivirus servers and then inform a job engine not to distribute tasks to those nodes.

To provide antivirus scanning job support for NANON nodes, the following approaches can be utilized based on a new job engine function and a new antivirus service utilizing a group messaging protocol.

In some examples, a status of an antivirus server is not synchronized between a job engine and an antivirus component through a group messaging protocol service. The antivirus component can get the status of the antivirus server, and then report the status to the group messaging protocol service, which can provide the status to the job engine. Based on that status, the job engine can determine whether to distribute antivirus scanning tasks to the antivirus agent. In some examples, if the antivirus server is not active on the corresponding node, the job tasks can be distributed to that node, and otherwise they are not.

A group messaging protocol service can be uniquely identified among services of the computing cluster. In some examples, an enumeration can be performed, and in other examples, a particular group messaging protocol service can be associated with a unique string. In enumeration examples, the group messaging protocol service enumeration for antivirus servers feature can be allocated. For example, GMP_SERVICE_ANTIVIRUS can be defined for an antivirus server, which can contain the following information:

```
enum gmp_service_id {
    GMP_SERVICE_TEST = 0,
    GMP_SERVICE_SMB = 1,
    GMP_SERVICE_NFS = 2,
    GMP_SERVICE_WITNESS = 3,
    GMP_SERVICE_HDFS = 4,
    GMP_SERVICE_SWIFT = 5,
    GMP_SERVICE_ALL_PROTOCOLS = 6,
    GMP_SERVICE_ISI_CBIND_D = 7,
    GMP_SERVICE_LSASS = 8,
    GMP_SERVICE_DRAIN = 9,
    GMP_SERVICE_ANTIVIRUS = 13,
    GMP_SERVICE_MAX = 14,
    GMP_SERVICE_NONE = -1
};
```

In an antivirus component, a timer task can run periodically. In this timer task, a function, AvscanServersTimerEvent( ) can be executed, which can check whether antivirus servers are online. In some examples, if at least one antivirus server is online, the antivirus component can regard the antivirus server's status as available. Then, the antivirus component can report this status to the GMP using an application programming interface (API) call gmp_service_open(GMP_SERVICE_ANTIVIRUS) in an active situation or an API call close(fd) in an inactive situation.

A heartbeat can be maintained to determine that the antivirus component is operating properly. In some examples, a heartbeat monitor component can implement a heartbeat monitor API that can be invoked to make heartbeat communications with the antivirus component. In some examples, the heartbeat can be included with a group management protocol service API. For example, the group management protocol service can additionally provide an API call gmp_service_heartbeat(GMP_SERVICE_ANTIVIRUS) to maintain a heartbeat between an antivirus component and the group management protocol service, and this API call can be called in AvscanServersTimerEvent( ) too.

```
/** open a service file descriptor */
int gmp_service_open(enum gmp_service_id service);
/**
 * Send a heartbeat to indicate the service is still alive. The first
 * heartbeat initiates monitoring. If the process fails to send periodic
 * heartbeats from then on, it will be killed. The heartbeat interval is
 * determined by a sysctl efs.gmp.service.name.timeout_msecs.
 */
int gmp_service_heartbeat(enum gmp_service_id service);
```

A period of this timer task in the antivirus component can be 5 seconds, so in some examples a value of efs.gmp.service.name timeout_msecs should be set 10 seconds so that a heartbeat with a group management protocol service will not timeout.

In some examples, a job engine can determine a status of antivirus servers for the respective nodes before the job engine starts an antivirus scanning job. That is, in a computing cluster comprising multiple nodes, each node of the computing cluster can report its availability to perform antivirus tasks to a group messaging protocol service, and this information can be passed to a job engine. An example implementation for a job engine determining a status of antivirus servers for the respective nodes can be as follows.

```
/**
 * Select which nodes (by device id) the job engine should use
 * in processing this job.
 * @param[in] candidate_devids Possible nodes the job can run on
 * @param[out] permitted_devids Nodes selected from candidates to run
 job on
 * @param[out] ie_out error information
 */
void (*nodes_can_run_job)(const struct devid_set *candidate_devids,
struct devid_set *permitted_devids, struct isi_error **ie_out)
/**
 * Load gi with group info. Does not use global storage.
 * @param gi Will be filled in with parsed output from efs.gmp.group.
 * @param error_out Will be set on any errors
 */
void gmp_load_group_info(struct gmp_group_info *gi, struct isi_error
**error_out);
```

The job engine can then distribute antivirus scanning job tasks to nodes defined in "permitted_devids."

Example Architectures and Classifications

FIG. 1 illustrates an example system architecture 100 that can facilitate not all nodes on network (NANON) support for antivirus jobs in clustered storage, in accordance with certain embodiments of this disclosure.

As depicted, system architecture 100 comprises client computer 102, communications network 104a, communications network 104b, computing cluster 106, and antivirus server 108. NANON can indicate that some nodes of a computer cluster have not successfully connected to a common antivirus agent server.

In turn, computing cluster 106 comprises job engine with NANON support component 110, group management protocol component 112, and computing nodes 114a-114n. There can be examples with varying numbers of instances of computing nodes 114a-114n, and in the example of system architecture 100, n instances are depicted.

Figure 12:
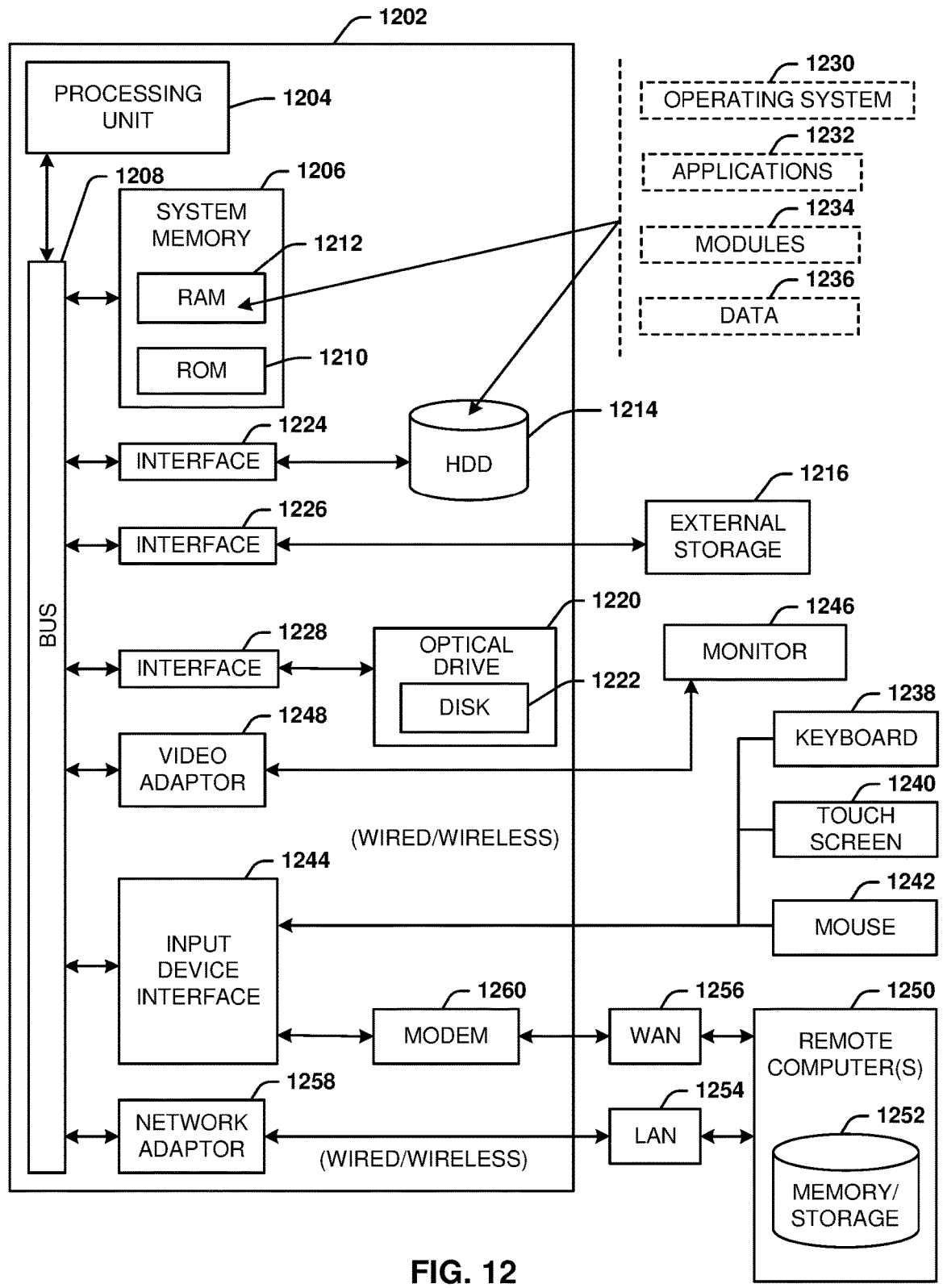
FIG. 12 illustrates an example block diagram of a computer operable to execute certain embodiments of this disclosure.

Each of client computer 102, computing cluster 106, antivirus server 108, and computing nodes 114a-114n can be implemented with one or more instances of computer 1202 of FIG. 12. In some examples, job engine with NANON support component 110 and group management protocol component 112 can be implemented with machine-executable instructions and/or part(s) of computer 1202 of FIG. 12.

Communications network 104a and communications network 104b each can comprise a computer communications network, such as the Internet, or an isolated private computer communications network.

Client computer 102 and computing cluster 106 can communicate via communications network 104a. In some examples, computing cluster 106 can provide computer storage resources that are accessible by client computer 102, such as to read, write, or modify a file on computing cluster 106. Computing cluster 106 can communicate with antivirus server 108 via communications network 104b in the course of performing antivirus operations on files stored on computing cluster 106.

In some examples, antivirus server 108 can perform scanning of the files of computing cluster 106. A node (e.g., computing node 114a, and in some examples, an antivirus component that operates on the node) can send a scan request to antivirus server 108 via a hypertext transfer protocol (HTTP), where the request can contain a file path on computing cluster 106. Antivirus server 108 can scan the file identified by the file path via a SMB protocol, and can return a result of the scan back to the node (e.g., to the antivirus component on the node).

In some examples, the node can also determine a version of an antivirus definition file used by antivirus server 108. The node can relay this version as part of a heartbeat mechanism, so that job engine 110 can use this information in determining whether a file needs to be scanned (e.g., because the file has not been scanned with a current version of the antivirus definition file, which can include new virus signatures compared to an older version).

In other examples, a node can download an antivirus definition file from antivirus server 108, and the node itself can perform antivirus scanning of files.

In some examples, some but not all of computing nodes 114a-114n can be configured to connect to antivirus server 108. For instance, it can be that a particular computing node is not physically connected to communications network 104b, is not configured to use communications network 104b, or is not configured to communicate with antivirus server 108 because the computing node is configured to use communications network 104b via a first subnet and antivirus server 108 is configured to use communications network 104b via a second subnet. A computing node of computing cluster 106 that is not configured to access antivirus server 108 can be classified as having a NANON status.

Group management protocol component 112 can communicate with computing nodes 114a-114n to determine which of these computing nodes are configured to access antivirus server 108. A group management protocol generally can comprise a computer protocol that can propagate a change in a state of a node of a computer cluster to other nodes of the computer cluster. Group management protocol component 112 can communicate this information regarding which of computing nodes are configured to access antivirus server 108 to job engine with NANON support component 110.

Job engine with NANON support component 110 can then distribute an antivirus scanning job among those computing nodes that are configured to access antivirus server 108 A job can comprise a sequence of phases that produces a well-defined change in the state of a computer cluster. A job can be divided into multiple tasks. A task can comprise a chunk of work that makes sense to move between nodes. That is, in some examples, a task can define at least a few seconds of work. To load balance work, tasks can be split and exchanged between nodes. An example of a task can be a range of possible logical Modes (LINs) for a system call that returns a set of actual LINs.

An antivirus job can comprise scanning some or all files stored on computing cluster 106. Distributing an antivirus job can comprise instruction a computing node which specific files (or directories that contain files) that computing node is to perform antivirus scanning on.

Figure 5:
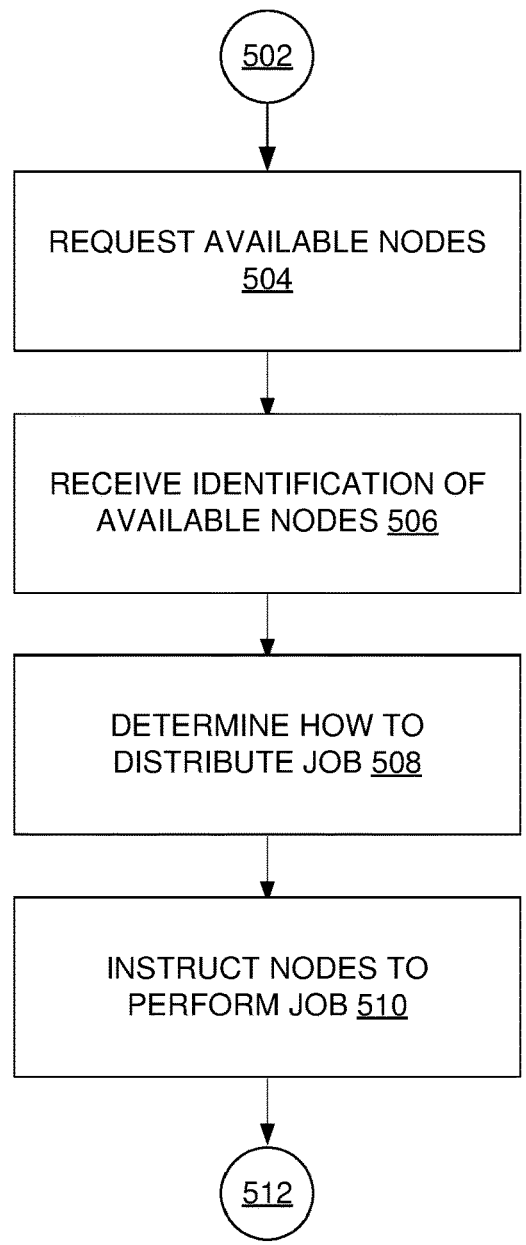
FIG. 5 illustrates an example process flow for a job engine that can facilitate that can facilitate NANON support for antivirus jobs in clustered storage, in accordance with certain embodiments of this disclosure.
Figure 6:
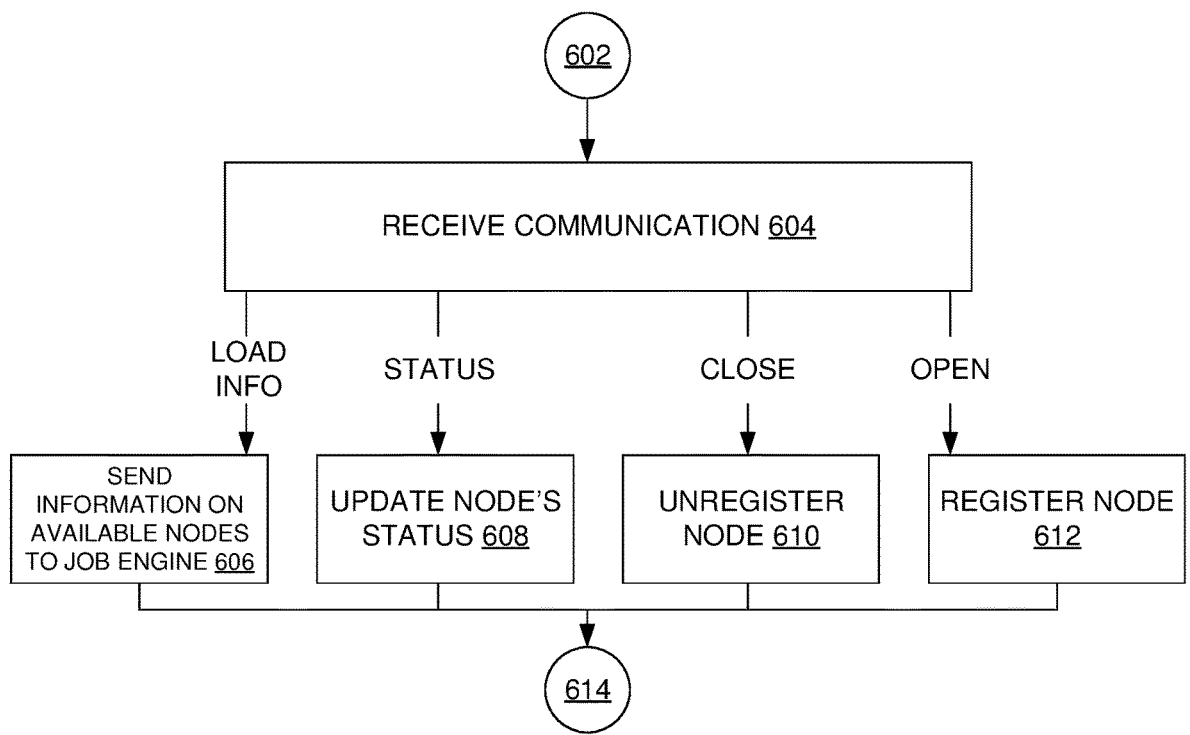
FIG. 6 illustrates an example process flow for a group management protocol component that can facilitate that can facilitate NANON support for antivirus jobs in clustered storage, in accordance with certain embodiments of this disclosure.
Figure 7:
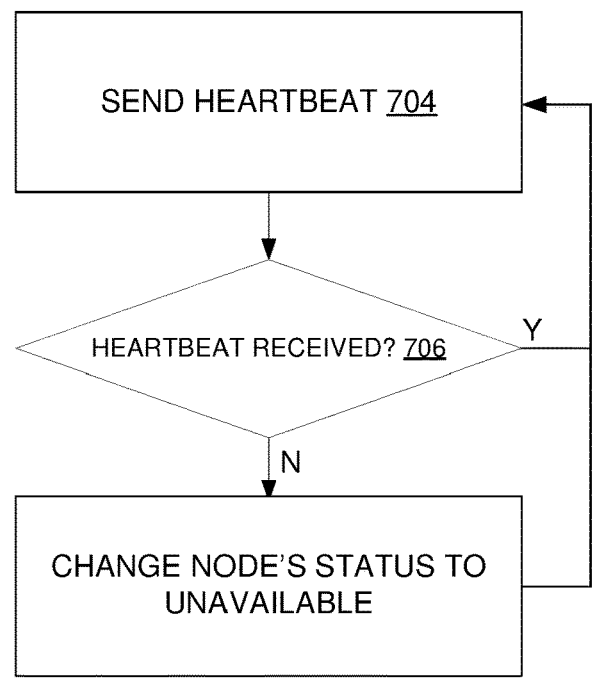
FIG. 7 illustrates an example process flow for a group management protocol component that can facilitate that can facilitate NANON support for antivirus jobs in clustered storage, in accordance with certain embodiments of this disclosure.
Figure 8:
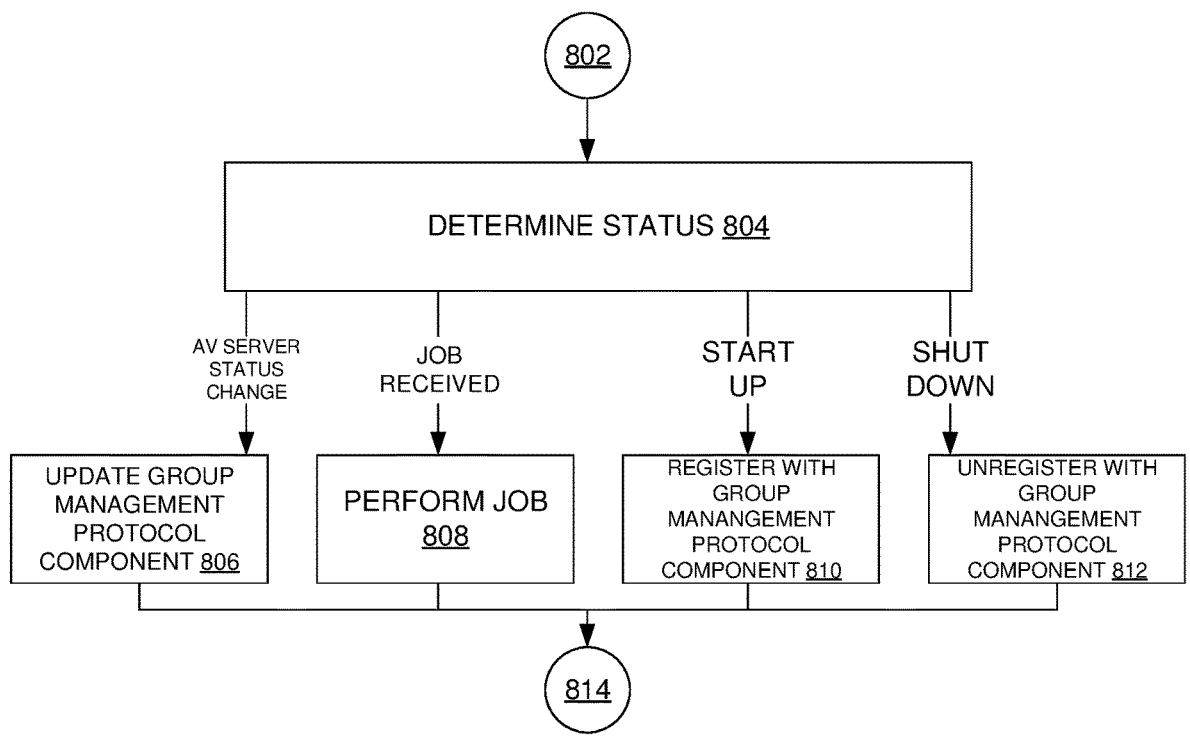
FIG. 8 illustrates an example process flow for an antivirus component that can facilitate that can facilitate NANON support for antivirus jobs in clustered storage, in accordance with certain embodiments of this disclosure.
Figure 9:
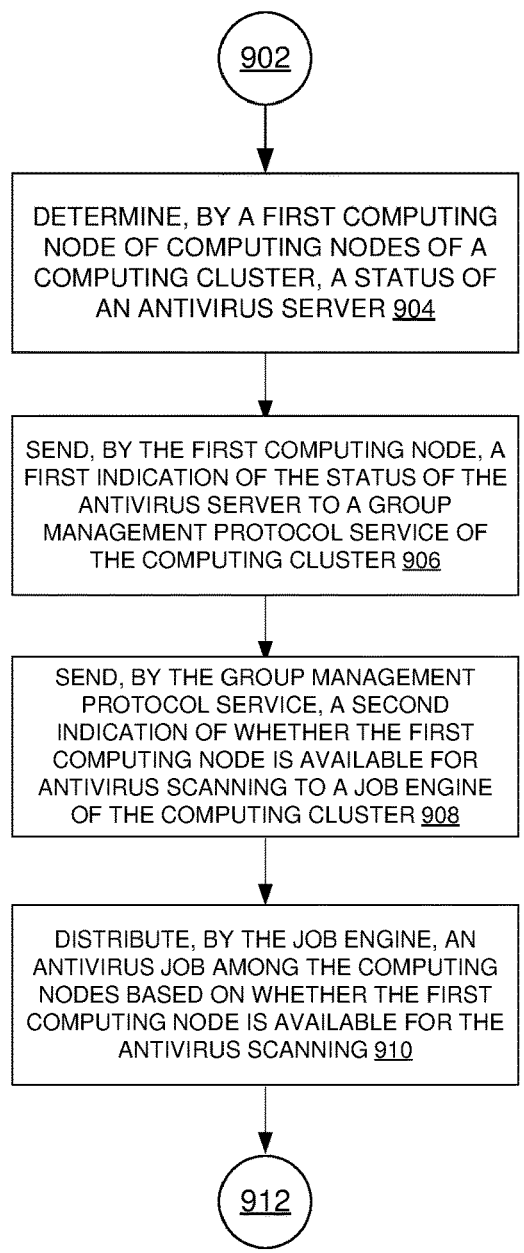
FIG. 9 illustrates an example process flow for NANON support for antivirus jobs in clustered storage, in accordance with certain embodiments of this disclosure.
Figure 10:
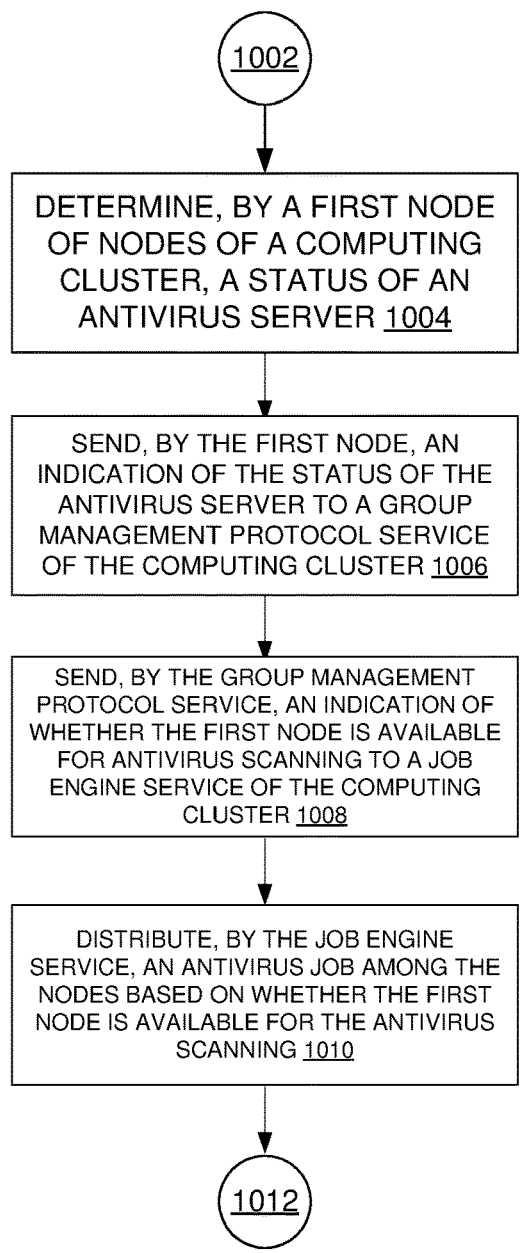
FIG. 10 illustrates another example process flow for NANON support for antivirus jobs in clustered storage, in accordance with certain embodiments of this disclosure.
Figure 11:
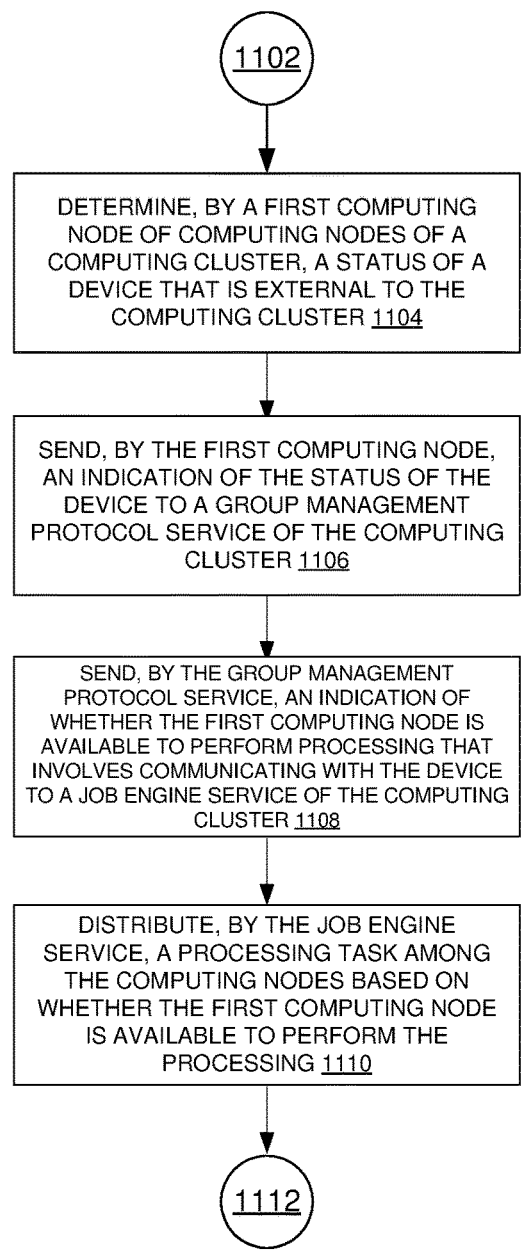
FIG. 11 illustrates another example process flow for NANON support for antivirus jobs in clustered storage, in accordance with certain embodiments of this disclosure.

In implementing NANON support for antivirus jobs in clustered storage, computing cluster 106 can implement part(s) of process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

It can be appreciated that, while the example of system architecture 100, and elsewhere, involves antivirus scanning, that the present techniques can be more generally applied to tasks that are distributing among multiple computers, where some of these multiple computers are not configured to perform the task at a time when it is being determined how to distribute the task among the multiple computers.

Figure 2:
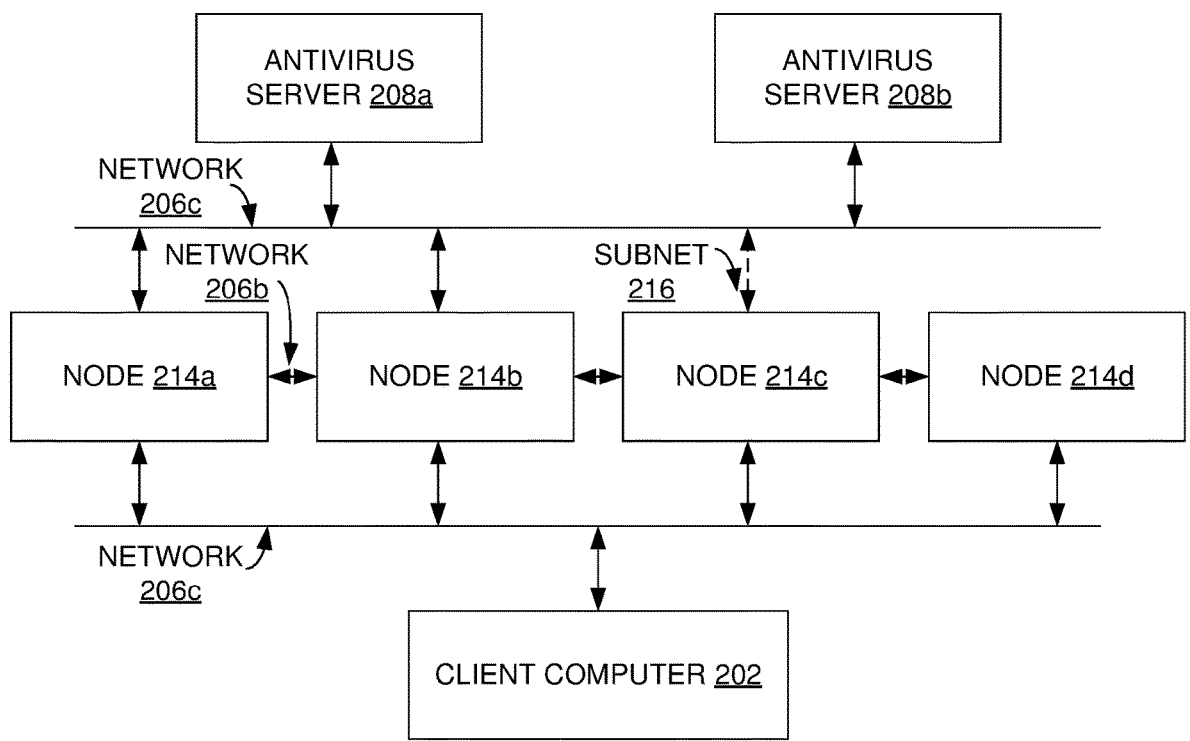
FIG. 2 illustrates an example system architecture of how computing nodes can be connected to networks that can facilitate NANON support for antivirus jobs in clustered storage, in accordance with certain embodiments of this disclosure.

FIG. 2 illustrates an example system architecture 200 of how computing nodes can be connected to networks that can facilitate not all nodes on network (NANON) support for antivirus jobs in clustered storage, in accordance with certain embodiments of this disclosure. As depicted, system architecture 200 comprises client computer 202, network 204a, network 204b, network 204c, antivirus server 208a, antivirus server 208b, node 214a, node 214b, node 214c, node 214d, and subnet 216.

Client computer 202 can be similar to client computer 102 of FIG. 1. Network 204a, network 204b, and network 204c can each comprise a communications network that is similar to communications network 104a or communications network 104b of FIG. 1. Network 204a can comprise a front-end communications network that connects client computer 202 to node 214a, node 214b, node 214c, and node 214d. Network 204b can comprise an intranet (such as within a computing cluster) communications network that connects node 214a, node 214b, node 214c, and node 214d with each other.

Network 204c can comprise a back-end communications network that connects antivirus server 208a and antivirus server 208b with some of node 214a, node 214b, node 214c, and node 214d. As depicted, node 214a and node 214b are connected to network 204c and configured to communicate with antivirus server 208a and antivirus server 208b.

Node 214c is connected to network 204c using subnet 216, but is not configured to communicate with antivirus server 208a and antivirus server 208b because the antivirus servers are configured to use a different subnet. A subnet can generally comprise a logical subdivision of a computer network, such as via Internet Protocol (IP) addresses. In some examples, two computers can be connected to the same communications network, but be unable to communicate with each other because they are configured to use different subnets on the communications network.

Node 214d is not connected to network 204c, so cannot communicate with antivirus server 208a and antivirus server 208b.

Node 214a, node 214b, node 214c, and node 214d can be part of a computing cluster, such as computing cluster 106, and this computing cluster can be configured to facilitate NANON support for antivirus jobs in clustered storage.

Figure 3:
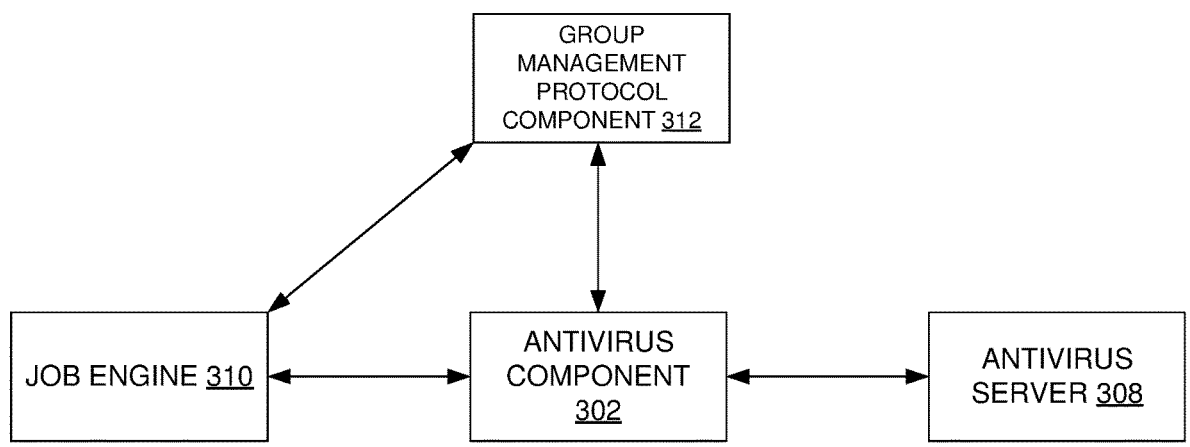
FIG. 3 illustrates an example system architecture of components that can facilitate NANON support for antivirus jobs in clustered storage, in accordance with certain embodiments of this disclosure.

FIG. 3 illustrates an example system architecture 300 of components that can facilitate NANON support for antivirus jobs in clustered storage, in accordance with certain embodiments of this disclosure. As depicted, system architecture 300 comprises antivirus component 302, antivirus server 308, job engine 310, and group management protocol component 312.

In some examples, antivirus component 302 can be implemented with machine-executable instructions and/or part(s) of computer 1202 of FIG. 12, and operate on one or more of computing nodes 114a-114n of FIG. 1. In some examples, antivirus server 308 can be similar to antivirus server 108 of FIG. 1; job engine 310 can be similar to job engine with NANON support component 110, and group management protocol component 312 can be similar to group management protocol component 112.

Antivirus component 302 (which can be a daemon in some examples) can facilitate antivirus scanning on a computing node upon which antivirus component 302 operates. Antivirus component 302 can facilitate antivirus scanning by sending scan requests to one or more antivirus servers (e.g., antivirus server 308) to scan one or more files, and processing corresponding response from the antivirus server(s).

Antivirus component 302 can determine the health of one or more antivirus servers (e.g., antivirus server 308) by sending periodic heartbeats. Antivirus component 302 can also communicate with antivirus server 308 to receive a version of an antivirus definition file that antivirus server 308 uses in scanning files for viruses. Antivirus component 302 can periodically exchange messages with antivirus server 308 to determine that antivirus server 308 continues to be accessible by antivirus component 302.

Antivirus component 302 can send a message to group management protocol component 312 to register with group management protocol component 312 and communicate whether, and to what degree, antivirus component 302 is configured to perform antivirus activities (e.g., whether antivirus component 302 can reach antivirus server 308). Antivirus component 302 can send a message to group management protocol component 312 to de-register.

Where antivirus component 302 determines that it has experienced a status change (e.g., antivirus component 302 has changed from being unable to perform antivirus activities to being able to perform antivirus activities, or vice versa), antivirus component 302 can send a message to group management protocol component 312 that indicates this status change.

Group management protocol component 312 can initiate and exchange heartbeat messages with antivirus component 302. These heartbeat messages can be used by group management protocol component 312 to determine that antivirus component 302 is still operating. In some examples, antivirus component 302 exchanges messages with antivirus server 308 to determine that antivirus server 308 remains accessible according to a first cadence (e.g., every 5 seconds). In such examples, group management protocol component 312 can exchange heartbeat messages with antivirus component 302 according to a slower cadence (e.g., every 10 seconds).

In some examples, there can be multiple instances of antivirus component 302, which operate on different nodes of a computing cluster. Group management protocol component 312 can maintain information on which nodes of a computing cluster are available to perform antivirus scanning tasks. Job engine 310 can query group management protocol component 312 for this information about which nodes are available to perform antivirus scanning tasks, and group management protocol component 312 can respond by sending job engine 310 an identification of those nodes that are available to perform antivirus scanning tasks. The identity of these nodes can change over time, e.g., as different nodes are or are not able to communicate with an antivirus server, such as antivirus server 308.

Based on this information received from group management protocol component 312, job engine 310 can determine how to divide an antivirus scanning job among the nodes available to perform antivirus scanning tasks. This dividing of an antivirus scanning job can comprise assigning particular nodes to scan particular files. Once determined, job engine 310 can send an indication of which files to scan to one or more antivirus components (such as antivirus component 302) for each respective node.

Figure 4:
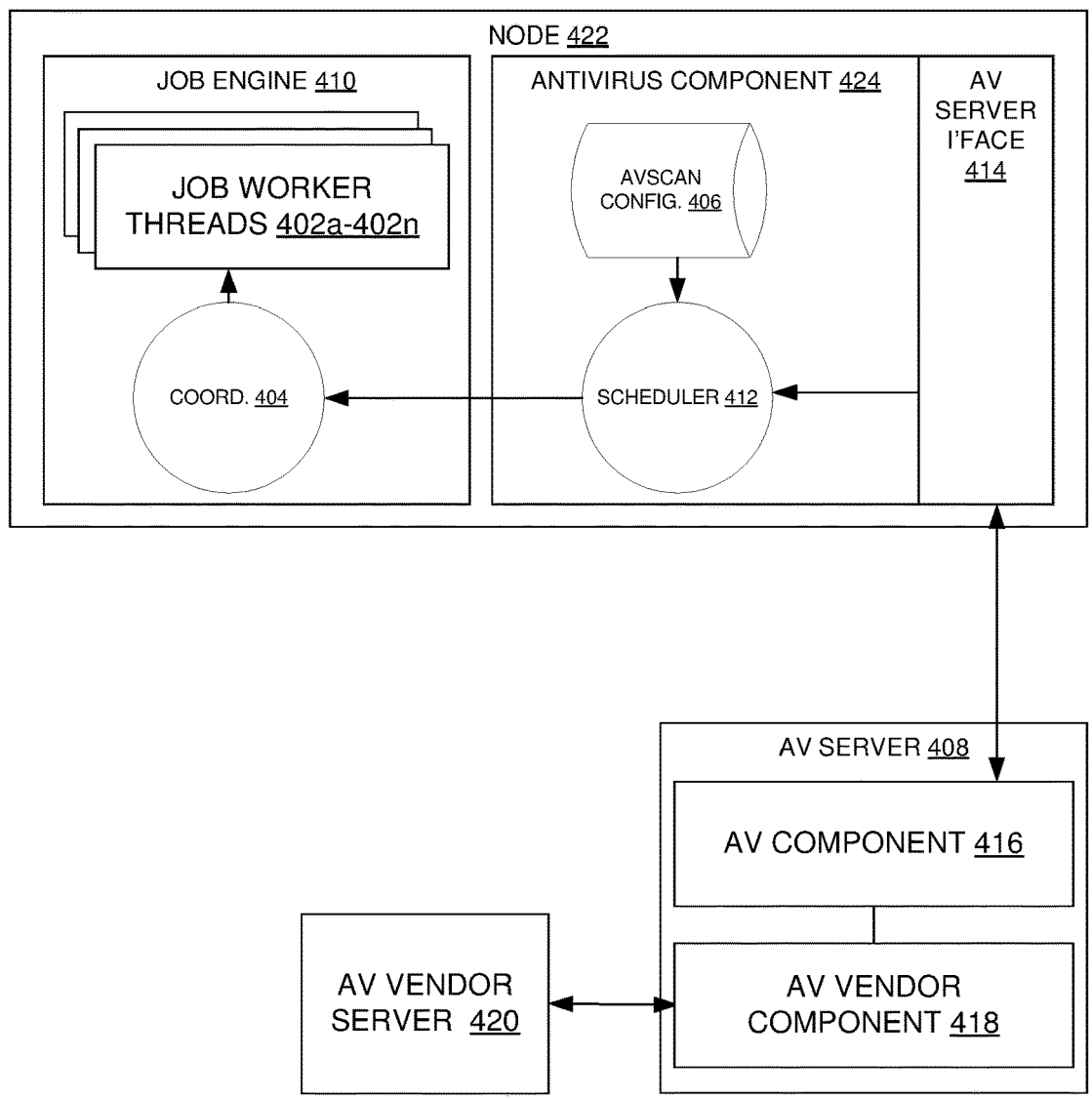
FIG. 4 illustrates another example system architecture of components that can facilitate NANON support for antivirus jobs in clustered storage, in accordance with certain embodiments of this disclosure.

FIG. 4 illustrates another example system architecture 400 of components that can facilitate NANON support for antivirus jobs in clustered storage, in accordance with certain embodiments of this disclosure. As depicted, system architecture comprises node 402, AV server 408, and AV vendor server 420.

In turn, node 402 comprises job engine 410, antivirus component 424, and antivirus (AV) server interface 414. Job engine 410 comprises job worker threads 402a-402n, and coordinator 404. Antivirus component 424 comprises AV scan configuration 406, and scheduler 412. AV server 408 comprises AV component 416 and AV vendor component 418.

In some examples, job engine 410 can be similar to job engine 110 of FIG. 1, antivirus component 424 can be similar to antivirus component 302 of FIG. 3, and AV server 408 can be similar to antivirus server 108 of FIG. 1. AV vendor server 420 can be implemented with one or more instances of computer 1202 of FIG. 12. Job worker threads 402a-402n, coordinator 404, AV scan configuration 406, scheduler 412, AV server interface 414, AV component 416, and AV vendor component each can be implemented with machine-executable instructions and/or part(s) of computer 1202 of FIG. 12.

Job worker threads 402a-402n can each comprise an instance of a process associated with a separate antivirus scanning task. Coordinator 404 can receive information from scheduler 412 about updated antivirus signature files, and use an updated file as a basis to start a new antivirus scanning task. Scheduler 412 can receive this information about updated antivirus signature files from AV server interface 414. Scheduler 412 can also operate according to configuration parameters defined in AV scan configuration 406 (such as a regular schedule on which to perform antivirus scanning where there is no updated antivirus signature file).

AV server interface 414 can communicate with AV component 416 of AV server 408 regarding updated antivirus signature files, and can download updated antivirus signature files. AV component 416 can interface with AV vendor component 418 regarding antivirus signature files, and AV vendor component 418 can download updated antivirus signature files from AV vendor server 420.

A problem with scheduled scans can be that file scanning can be invalidated once an antivirus definition file (sometimes referred to as a virus signature file, or similar terms) has been updated. This problem can be because the antivirus signature file can contain a signature for a new virus that was not checked in the previous scheduled scan job. So, there can be the case where 10,000 files are scanned as part of a scheduled scan job, and as soon as a new antivirus signature file is installed on an antivirus server, those 10,000 files are considered to be unsafe.

In system architecture 400, an antivirus job can be started when an antivirus signature file is updated, and this antivirus job can be implemented to facilitate NANON support for antivirus jobs in clustered storage. In some examples, this approach can be implemented as follows:

1. A user can create one or more antivirus jobs, using an 'aysigupdate' tag instead of a schedule string.
2. Antivirus component 424 can read in and process a configuration for the jobs. Multiple AVScan jobs can be configured, and in some examples, each job can have its own settings.
3. AV server interface 414 can download and install a new antivirus signature file.
4. Antivirus component 424 can determine that a new antivirus signature file has been downloaded, and in response, antivirus component 424 can update an internal timestamp.
5. AV server interface 414 can periodically send out heartbeat requests. A heartbeat response can have a timestamp of the antivirus signature file.
6. AV server interface 414 can check the timestamp sent in the heartbeat response against the value stored by antivirus component 424. If the heartbeat response timestamp is greater than value stored by antivirus component 424, AV server interface 414 can store the timestamp with antivirus component 424 and signal to start one or more antivirus scan jobs.
7. When it is determined that a new antivirus signature file has been installed, antivirus component 424 can iterate through a list of jobs, and select those jobs that have an 'aysigupdate' tag.
8. In some examples, if an aysigupdate job is not already running (such as where the aysigupdate agent was started by another node), then an aysigupdate job can be started by contacting job engine 410.

FIG. 5 illustrates an example process flow 500 for a job engine that can facilitate that can facilitate NANON support for antivirus jobs in clustered storage, in accordance with certain embodiments of this disclosure. In some examples, one or more embodiments of process flow 500 can be implemented by job engine 110 of FIG. 1, or computing environment 1200 of FIG. 12.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 500 begins with 502, and moves to operation 504. Operation 504 depicts requesting available nodes. This can comprise job engine 110 of FIG. 1 sending a request to group management protocol component 112 to identify which of computing nodes 114a-114n are available to perform antivirus processing tasks. After operation 504, process flow 500 moves to operation 506.

Operation 506 depicts receiving an identification of available nodes. This can comprise a communication received from group management protocol component 112 received by job engine 110 in response to the request of operation 504. After operation 506, process flow 500 moves to operation 508.

Operation 508 depicts determining how to distribute a job. Job engine 110 can have an identification of available nodes from operation 506. Job engine 110 can then distribute a job, such as an antivirus scanning job, among those nodes, such as by instructing each of the nodes to scan a different subset of files of a total set of files to be scanned as part of the job.

In some examples, job engine 110 can evenly distribute the job, such as by assigning approximately a same number of files, or same amount of data to each node to scan. In other examples, job engine 110 can unevenly distribute the job, such as by instruction a node with a lower processing load to scan more files than a node with a higher processing load. After operation 508, process flow 500 moves to operation 510.

Operation 510 depicts instructing nodes to perform the job. This can comprise job engine 110 sending a communication to each node of computing nodes 114a-114n that is selected for performing the job that indicates which part of the job to perform (e.g., which files on which to perform antivirus scanning).

These nodes can then perform their respective part of the job, and collectively, the job can be performed in a distributed manner across a computing cluster that comprises the nodes. After operation 510, process flow 500 moves to 512, where process flow 500 ends.

FIG. 6 illustrates an example process flow 600 for a group management protocol component that can facilitate that can facilitate NANON support for antivirus jobs in clustered storage, in accordance with certain embodiments of this disclosure. In some examples, one or more embodiments of process flow 600 can be implemented by group management protocol component 112 of FIG. 1, group management protocol component 312 of FIG. 3, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 700 of FIG. 7, process flow 800 of FIG. 8, process flow 900 of FIG. 9, process flow 1000 of FIG. 10, and/or process flow 1100 of FIG. 11.

Process flow 600 begins with 602, and moves to operation 604. Operation 604 depicts receiving a communication. In some examples, this can comprise a communication received from job engine 310 of FIG. 3, or a communication received from antivirus component 302 of FIG. 3. Group management protocol component 312 can process this communication, and based on the communication, move to one of operations 606-612.

Operation 606 is reached from operation 604 where the received communication in operation 604 indicates load info. Operation 606 depicts sending information on available nodes to a job engine. In some examples, operation 606 can be performed in a similar manner as operation 506 of FIG. 5 (where operation 506 can comprise receiving the information on available nodes sent here in operation 606).

After operation 606, process flow 600 moves to 614, where process flow 600 ends. In some examples, iterations of process flow 600 can be implemented to process communications as they are received.

Operation 608 is reached from operation 604 where the received communication in operation 604 indicates status. Operation 608 depicts updating a node's status.

In some examples, antivirus component 302 of FIG. 3 can determine that a status of its ability (and the ability of a node upon which it executes) has changed—such as from unavailable to available. A reason that a status can change can be that antivirus component 302 is now available to communicate with antivirus server 308 after previously being unable to do so (indicating a status change from unavailable to available). Where antivirus component 302 determines that its status has changed, antivirus component 302 can send an indication of this status change to group management protocol component 312.

Group management protocol component 312 can maintain an association between respective nodes that have registered with group management protocol component 312, and respective statuses of these nodes. Group management protocol component 312 can store this association in a computer memory. Upon receiving this communication, group management protocol component 312 can update the status for the corresponding status.

After operation 608, process flow 600 moves to 614, where process flow 600 ends. In some examples, iterations of process flow 600 can be implemented to process communications as they are received.

Operation 610 is reached from operation 604 where the received communication in operation 604 indicates close. Operation 610 depicts unregistering a node. A node (in some examples, via an antivirus component that executes on a node) can register with group management protocol component 312 to indicate that the node is to be monitored for availability to perform jobs. Where a previously-registered node is to un-register (such as to go offline to perform system updates), the node can send an indication of this to group management protocol component 312.

In response, group management protocol component 312 can remove an indication of the node from a list of nodes for which group management protocol component 312 maintains statuses of the respective nodes to perform jobs.

After operation 610, process flow 600 moves to 614, where process flow 600 ends. In some examples, iterations of process flow 600 can be implemented to process communications as they are received.

Operation 612 is reached from operation 604 where the received communication in operation 604 indicates open. Operation 612 depicts registering a node. Similar to operation 610 (involving a close, and un-registering a node), in operation 612, when a node sends a communication to be registered by group management protocol component 312, group management protocol component 312 can store an association of the node and the node's status to perform jobs in a computer memory.

After operation 612, process flow 600 moves to 614, where process flow 600 ends. In some examples, iterations of process flow 600 can be implemented to process communications as they are received.

FIG. 7 illustrates an example process flow 700 for a group management protocol component that can facilitate that can facilitate NANON support for antivirus jobs in clustered storage, in accordance with certain embodiments of this disclosure. In some examples, one or more embodiments of process flow 700 can be implemented by antivirus component 302 of FIG. 3, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 600 of FIG. 6, process flow 800 of FIG. 8, process flow 900 of FIG. 9, process flow 1000 of FIG. 10, and/or process flow 1100 of FIG. 11.

Process flow 700 begins with 702, and moves to operation 704. Operation 704 depicts sending a heartbeat. This heartbeat can be sent to antivirus server 308 of FIG. 3. A heartbeat can generally comprise a message that requests an indication (or indicates) that a computer is operating properly. In some examples, antivirus component 302 can send a heartbeat message to antivirus server 308 according to a schedule (e.g., every 5 seconds), and determine whether a response is received (as in operation 706). Where a heartbeat response is received, antivirus component 302 can determine that antivirus component 302 is operating properly. Where a heartbeat response is not received, group management protocol component 312 can determine that antivirus component 302 is not operating properly.

After operation 704 process flow 700 moves to operation 706.

Operation 706 depicts determining whether a heartbeat was received. In some examples, this can comprise antivirus component 302 of FIG. 3 determining whether antivirus server 308 has responded to the heartbeat of operation 704 within a predetermined amount of time. Where antivirus server 308 responds within a predetermined amount of time, it can be determined that a heartbeat was received in operation 706. Instead, where antivirus server 308 does not within a predetermined amount of time, it can be determined that a heartbeat was not received in operation 706.

Where it is determined in operation 706 that a heartbeat was received, operation 706 moves to operation 704. Instead, where it is determined in operation 706 that a heartbeat was not received, process flow 700 moves to operation 708.

Operation 708 is reached from operation 706 where it is determined in operation 706 that a heartbeat was not received. Operation 708 depicts changing a node's status to unavailable. This can be in a case where group management protocol component 312 had a status for the node as available. Where group management protocol component 312 had a status for the node as unavailable, the status of the node can remain unchanged.

The node can be a node of a computer cluster (e.g., computing cluster 106 of FIG. 1) on which antivirus component 302 executes. Group management protocol component 312 can maintain a list of nodes that have registered with group management protocol component 312, as well as an indication of whether each node is available for performing antivirus scanning tasks.

Where antivirus server 308 fails to respond to a heartbeat message, antivirus component 302 can send a corresponding indication to group management protocol component 312, which can use this information as an indication that the corresponding node is unavailable for performing antivirus scanning tasks (or that the node is unregistered, similar to operation 610 of FIG. 6). If antivirus server 308 later resumes responding to heartbeat messages, antivirus component 302 can send a corresponding indication to group management protocol component 312, which can change the status of the corresponding node to available (or register, similar to operation 612 of FIG. 6).

That is, antivirus component 302 can utilize a group management protocol provided by group management protocol component 312 to inform a job engine (e.g., job engine 310 of FIG. 3) whether the node upon which antivirus component 302 can communicate with an antivirus server (e.g., antivirus server 308).

After operation 708, process flow 700 moves to operation 704.

Iterations of operations 704-708 can be performed to periodically exchange heartbeat messages between group management protocol component 312 and antivirus component 302 to determine whether antivirus component 302 is operating properly.

FIG. 8 illustrates an example process flow 800 for an antivirus component that can facilitate that can facilitate NANON support for antivirus jobs in clustered storage, in accordance with certain embodiments of this disclosure. In some examples, one or more embodiments of process flow 700 can be implemented by antivirus component 302 of FIG. 3, computing cluster 106 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 600 of FIG. 6, process flow 700 of FIG. 7, process flow 900 of FIG. 9, process flow 1000 of FIG. 10, and/or process flow 1100 of FIG. 11.

Process flow 800 begins with 802, and moves to operation 804. Operation 804 depicts determining a status. This status can be part of a communication received by antivirus component 302 of FIG. 3, and from job engine 310, group management protocol component 312, or antivirus server 308. Antivirus component 302 can process this communication. In other examples, this status can be a status determined by antivirus component 302 (such as determining that antivirus server 308 is not reachable because antivirus component 302 has not received a communication from antivirus server 308 within a predetermined amount of time). Based on this status, process flow 800 can move to one of operations 806-812.

Operation 806 is reached from operation 804 where the status is determined to be AV server status change. Operation 806 depicts updating a group management protocol component. In some examples, the AV server status can comprise an ability of antivirus component 302 indicate to antivirus server 308 a respective path to one or more files for antivirus server 308 to scan for viruses. Antivirus component 302 can periodically (e.g., every 5 seconds) send a heartbeat message to antivirus server 308.

Where antivirus component 302 had previously determined that antivirus server 308 was accessible via these messages, and now determines that antivirus server 308 is inaccessible because antivirus server 308 has failed to respond to a heartbeat message within a predetermined amount of time, antivirus component 302 can update group management protocol component 312 with an indication that antivirus component 302 is now unavailable to perform antivirus job tasks.

Similarly, where antivirus component 302 had previously determined that antivirus server 308 was inaccessible via these messages, and now determines that antivirus server 308 is accessible because antivirus server 308 has resumed (or started) responding to a heartbeat message within a predetermined amount of time, antivirus component 302 can update group management protocol component 312 with an indication that antivirus component 302 is now available to perform antivirus job tasks.

In other examples, antivirus component 302 can otherwise determine that a status of antivirus component 302 to perform antivirus job tasks has changed, and can send an indication of this to group management protocol component 312 (which can receive and process this indication similar to operation 608 of FIG. 6).

After operation 806, process flow 800 moves to 814, where process flow 800 ends. In some examples, iterations of process flow 800 can be implemented to process statuses as they occur.

Operation 808 is reached from operation 804 where the status is determined to job received. Operation 806 depicts performing a job. This can be an antivirus scanning job to be performed, and the message received can be similar to a message sent according to operation 510 of FIG. 5, where a job engine can distribute a job among available nodes.

After operation 808, process flow 800 moves to 814, where process flow 800 ends. In some examples, iterations of process flow 800 can be implemented to process statuses as they occur.

Operation 810 is reached from operation 804 where the status is determined to be start up. Operation 806 depicts registering with a group management protocol component. In some examples, when a node boots up, the node (or an instance of antivirus component 302 that operates on the node) can register with group management protocol component 312 to indicate that the node is to be monitored for an availability to perform antivirus job tasks. This can be performed in a similar manner as a group management protocol component registering a node in operation 612 of FIG. 6.

After operation 810, process flow 800 moves to 814, where process flow 800 ends. In some examples, iterations of process flow 800 can be implemented to process statuses as they occur.

Operation 812 is reached from operation 804 where the status is determined to be shut down. Operation 806 depicts unregistering with a group management protocol component. Similar to operation 810 (which involves a node starting up), when a node shuts down or reboots (such as to perform system updates), an antivirus component that operates on the node can send an indication of this shut down to a group management protocol component, which can unregister the node. This unregistering can be performed similar to operation 610 of FIG. 6.

After operation 806, process flow 800 moves to 814, where process flow 800 ends. In some examples, iterations of process flow 800 can be implemented to process statuses as they occur.

FIG. 9 illustrates an example process flow 900 for NANON support for antivirus jobs in clustered storage, in accordance with certain embodiments of this disclosure. In some examples, one or more embodiments of process flow 900 can be implemented by computing cluster 106 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 600 of FIG. 6, process flow 700 of FIG. 7, process flow 800 of FIG. 8, process flow 1000 of FIG. 10, and/or process flow 1100 of FIG. 11.

Process flow 900 begins with 902, and moves to operation 904. Operation 904 depicts determining, by a first computing node of computing nodes of a computing cluster, a status of an antivirus server. In some examples, this can comprise antivirus component 302 of FIG. 3 determining a status of antivirus server 308.

In some examples, operation 904 comprises continuing to determine, by the first computing node, the status of the antivirus server upon expiration of a timer. That is, this determination can be made periodically, such as every 5 seconds. After operation 904, process flow 900 moves to operation 906.

Operation 906 depicts sending, by the first computing node, a first indication of the status of the antivirus server to a group management protocol service of the computing cluster. In some examples, this can comprise antivirus component 302 of FIG. 3 sending this first indication to group management protocol component 312.

In some examples, operation 906 comprises in response to determining, by the first computing node, that the status of the antivirus server has changed from unavailable to available, sending a communication to the group management protocol service to open a file descriptor corresponding to the first computing node. In some examples, operation 906 comprises, in response to determining, by the first computing node, that the status of the antivirus server has changed from available to unavailable, sending a communication to the group management protocol service to close a file descriptor corresponding to the first computing node.

In some examples, operation 906 comprises in response to determining, by the first computing node, that the status of the antivirus server is unchanged, determining not to send a communication to the group management protocol service regarding the status of the antivirus server. That is, various mechanisms can be utilized to convey a status change, and in examples where the first computing node determines that the status has not changed, the first computing node can determine not to send an indication of this to the group management protocol service (which can determine that a status remains the same until informed otherwise).

After operation 906, process flow 900 moves to operation 908.

Operation 908 depicts sending, by the group management protocol service, a second indication of whether the first computing node is available for antivirus scanning to a job engine of the computing cluster. This can comprise group management protocol component 312 of FIG. 3 sending this second indication to job engine 310.

In some examples of operation 908 is performed in response to the job engine querying the group management protocol service for the second indication of whether the first computing node is available for the antivirus scanning.

After operation 908, process flow 900 moves to operation 910.

Operation 910 depicts distributing, by the job engine, an antivirus job among the computing nodes based on whether the first computing node is available for the antivirus scanning. This can comprise job engine 310 of FIG. 3 performing operations similar to operations 508-510 of FIG. 5.

In some examples, the antivirus job comprises scanning a first file and a second file. In such examples, operation 910 can comprise sending, by the job engine, a first communication to a second computing node of the computing nodes to scan the first file for viruses, sending, by the job engine, a second communication to a third computing node of the computing nodes to scan the second file for viruses. That is, distributing an antivirus job can comprise instructing different nodes to scan different, specified, files.

After operation 910, process flow 900 moves to 912, where process flow 900 ends.

FIG. 10 illustrates another example process flow 1000 for NANON support for antivirus jobs in clustered storage, in accordance with certain embodiments of this disclosure. In some examples, one or more embodiments of process flow 1000 can be implemented by computing cluster 106 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, and/or process flow 1100 of FIG. 11.

Process flow 1000 begins with 1002, and moves to operation 1004. Operation 1004 depicts determining, by a first node of nodes of a computing cluster, a status of an antivirus server. In some examples, operation 1004 can be implemented in a similar manner as operation 904 of FIG. 9.

After operation 1004, process flow 1000 moves to operation 1006.

Operation 1006 depicts sending, by the first node, an indication of the status of the antivirus server to a group management protocol service of the computing cluster. In some examples, operation 1006 can be implemented in a similar manner as operation 906 of FIG. 9.

In some examples, operation 1006 can comprise periodically sending, by the group management protocol service, a heartbeat message to the first node. That is, the group management protocol service can exchange heartbeats with the first node to determine that the first node continues to operate properly and be available to perform antivirus scanning jobs.

In some examples, this comprises in response to not receiving, by the group management protocol service, a response to the heartbeat message from the first node within a predetermined amount of time, determining that the first node is unavailable for the antivirus scanning That is, the group management protocol service can determine that the first node is unavailable for antivirus scanning if the group management protocol service does not receive a response after a certain amount of time.

In some examples, a first time period elapses between sending heartbeat messages from the group management protocol service to the first node, wherein a second time period elapses between instances of the first node determining the status of the antivirus server, and wherein the first time period is greater than the second time period. That is, a cadence for the group management protocol service sending heartbeats can be longer than a cadence that the first node uses for checking accessibility of the antivirus server (e.g., 10 seconds and 5 seconds, respectively).

After operation 1006, process flow 1000 moves to operation 1008.

Operation 1008 depicts sending, by the group management protocol service, an indication of whether the first node is available for antivirus scanning to a job engine service of the computing cluster. In some examples, operation 1008 can be implemented in a similar manner as operation 908 of FIG. 9.

After operation 1008, process flow 1000 moves to operation 1010.

Operation 1010 depicts distributing, by the job engine service, an antivirus job among the nodes based on whether the first node is available for the antivirus scanning In some examples, operation 1010 can be implemented in a similar manner as operation 910 of FIG. 9.

In some examples, operation 1010 comprises instructing the first node to perform part of the antivirus job based on determining that the first node is available for the antivirus scanning That is, the job engine can distribute part of the job to the first node when the first node is available to perform antivirus scanning.

In some examples, operation 1010 comprises determining to exclude the first node from performing part of the antivirus job based on determining that the first node is unavailable for the antivirus scanning That is, the job engine can omit the first node from nodes that the job engine distributes an antivirus job to when the first node is unavailable to perform antivirus scanning.

In some examples, the antivirus job comprises scanning a first file and a second file. In such examples, operation 1110 can comprise sending, by the job engine service, a first communication to a second node of the nodes to scan the first file for viruses, and sending, by the job engine service, a second communication to a third node of the nodes to scan the second file for viruses.

After operation 1010, process flow 1000 moves to 1012, where process flow 1000 ends.

FIG. 11 illustrates another example process flow 1100 for NANON support for antivirus jobs in clustered storage, in accordance with certain embodiments of this disclosure. In some examples, one or more embodiments of process flow 1100 can be implemented by computing cluster 106 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 1000 begins with 1002, and moves to operation 1004. Operation 1104 depicts determining, by a first computing node of computing nodes of a computing cluster, a status of a device that is external to the computing cluster. In some examples, operation 1104 can be implemented in a similar manner as operation 904 of FIG. 9.

In some examples, the computing nodes of the computing cluster are interconnected via a first communications network, and wherein the computing cluster is interconnected with the device that is external to the computing cluster via a second communications network. That is, the nodes of the cluster can be connected via a front-end network, and an antivirus server can be accessed via a separate back-end network (that some nodes might not be connected to). In some examples, operation 1104 comprises determining that the first computing node cannot connect to the device that is external to the computing cluster when the first computing node is not connected to the second communications network. That is, an example of why a node cannot connect to an antivirus server can be that the node is not connected to the back-end network.

In some examples, operation 1104 comprises determining that the first computing node cannot connect to the device that is external to the computing cluster when the first computing node is connected to the second communications network via a first subnet, and the device that is external to the computing cluster is connected to the second communications network via a second subnet. That is, an example of why a node cannot connect to an antivirus server can be that the node is connected to the back-end network, but using a different subnet than the antivirus server is using for the back-end network.

After operation 1104, process flow 1100 moves to operation 1006.

Operation 1006 depicts sending, by the first computing node, an indication of the status of the device to a group management protocol service of the computing cluster. In some examples, operation 1106 can be implemented in a similar manner as operation 906 of FIG. 9.

After operation 1106, process flow 1100 moves to operation 1108.

Operation 1108 depicts sending, by the group management protocol service, an indication of whether the first computing node is available to perform processing that involves communicating with the device to a job engine service of the computing cluster. In some examples, operation 1108 can be implemented in a similar manner as operation 908 of FIG. 9.

After operation 1108, process flow 1100 moves to operation 1110.

Operation 1110 depicts distributing, by the job engine service, a processing task among the computing nodes based on whether the first computing node is available to perform the processing. In some examples, operation 1110 can be implemented in a similar manner as operation 910 of FIG. 9.

In some examples, the device that is external to the computing cluster comprises an antivirus server, and the processing task comprises scanning a specified group of files. In some examples, the device that is external to the computing cluster comprises an authentication server. That is, types of jobs to be performed can include antivirus scanning, and authentication jobs that utilize an authentication server.

After operation 1110, process flow 1100 moves to 1112, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of client computer 102, computing cluster 106, and/or antivirus server 108 of FIG. 1. In some examples, computing environment 1200 can implement one or more embodiments of the process flows of FIGS. 5-11 to facilitate NANON support for antivirus jobs in clustered storage.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining, by a first computing node of computing nodes of a computing cluster, a status of the first computing node being able to access an antivirus server that is external to the computing cluster;
sending, by the first computing node, a first indication of the status of the antivirus server to a group management protocol service of the computing cluster;
sending, by the group management protocol service, a second indication that the first computing node is available for antivirus scanning to a job engine of the computing cluster; and
distributing, by the job engine, an antivirus job among the computing nodes based on the first computing node being available for the antivirus scanning, wherein the distributing excludes consideration of a second computing node of the computing nodes based on receiving a third indication from the group management protocol service that the second computing node is unable to access the antivirus server or another antivirus server that is external to the computing cluster, wherein the first computing node is located on a first network subnet of the computing cluster that is configured for access of the antivirus server, and wherein the second computing node is located on a second network subnet of the computing cluster that lacks configuration for access of the antivirus server or the other antivirus server.

2. The system of claim 1, wherein the operations further comprise:
continuing to determine, by the first computing node, the status of the antivirus server upon expiration of a timer.

3. The system of claim 2, wherein the operations further comprise:
in response to determining, by the first computing node, that the status of the antivirus server has changed from unavailable to available, sending a communication to the group management protocol service to open a file descriptor corresponding to the first computing node.

4. The system of claim 2, wherein the operations further comprise:
in response to determining, by the first computing node, that the status of the antivirus server has changed from available to unavailable, sending a communication to the group management protocol service to close a file descriptor corresponding to the first computing node.

5. The system of claim 2, wherein the operations further comprise:
in response to determining, by the first computing node, that the status of the antivirus server is unchanged, determining not to send a communication to the group management protocol service regarding the status of the antivirus server.

6. The system of claim 1, where the antivirus job comprises scanning a first file and a second file, and wherein the distributing of the antivirus job among the computing nodes comprises:
sending, by the job engine, a first communication to the first computing node of the computing nodes to scan the first file for viruses; and
sending, by the job engine, a second communication to a third computing node of the computing nodes to scan the second file for viruses.

7. The system of claim 1, wherein the job engine queries the group management protocol service for the second indication of whether the first computing node is available for the antivirus scanning.

8. The system of claim 1, wherein the second computing node lacks a physical connection to a network of the antivirus server or the other antivirus server.

9. A method, comprising:
determining, by a first node of nodes of a computing cluster, a status of the first node being able to access an antivirus server that is external to the computing cluster;
sending, by the first node, an indication of the status of the antivirus server to a group management protocol service of the computing cluster;
sending, by the group management protocol service, an indication that the first node is available for antivirus scanning to a job engine service of the computing cluster; and
distributing, by the job engine service, an antivirus job among the nodes based on the first node being available for the antivirus scanning, wherein the distributing is performed based on considering a first group of nodes of the nodes for which respective second indications from the group management protocol service have been received indicating an availability for the antivirus scanning, wherein the distributing is performed based on considering a third indication from the group management protocol service that a second node of the nodes is unable to access the antivirus server or another antivirus server that is external to the computing cluster, wherein the first computing node is located on a first network subnet of the computing cluster that is configured for access of the antivirus server, and wherein the second computing node is located on a second network subnet of the computing cluster that lacks configuration for access of the antivirus server or the other antivirus server.

10. The method of claim 9, further comprising:
periodically sending, by the group management protocol service, a heartbeat message to the first node.

11. The method of claim 10, further comprising:
in response to not receiving, by the group management protocol service, a response to the heartbeat message from the first node within a predetermined amount of time, determining that the first node is unavailable for the antivirus scanning.

12. The method of claim 10, wherein a first time period elapses between sending heartbeat messages from the group management protocol service to the first node, wherein a second time period elapses between instances of the first node determining the status of the antivirus server, and wherein the first time period is greater than the second time period.

13. The method of claim 9, wherein the distributing of the antivirus job among the nodes comprises:
   instructing the first node to perform part of the antivirus job based on determining that the first node is available for the antivirus scanning.

14. The method of claim 9, wherein the distributing of the antivirus job among the nodes comprises:
   determining to exclude the first node from performing part of the antivirus job based on determining that the first node is unavailable for the antivirus scanning.

15. The method of claim 9, where the antivirus job comprises scanning a first file and a second file, and wherein the distributing of the antivirus job among the nodes comprises:
   sending, by the job engine service, a first communication to the first node of the nodes to scan the first file for viruses; and
   sending, by the job engine service, a second communication to a third node of the nodes to scan the second file for viruses.

16. A non-transitory computer-readable medium comprising instructions that, in response to execution, cause a system comprising a processor to perform operations, comprising:
   determining, by a first computing node of computing nodes of a computing cluster, a status of a device that is external to the computing cluster;
   sending, by the first computing node, an indication of the status of the device to a group management protocol service of the computing cluster;
   sending, by the group management protocol service, an indication of whether the first computing node is available to perform processing that involves communicating with the device to a job engine service of the computing cluster; and
   distributing, by the job engine service, a processing task among the computing nodes based on whether the first computing node is available to perform the processing, wherein the distributing excludes consideration of a second computing node of the computing nodes based on the group management protocol service sending a third indication that the second computing node is unavailable for the processing, wherein the first computing node is located on a first network subnet of the computing cluster that is configured for access of the antivirus server, and wherein the second computing node is located on a second network subnet of the computing cluster that lacks configuration for access of the antivirus server or another antivirus server.

17. The non-transitory computer-readable medium of claim 16, wherein the computing nodes of the computing cluster are interconnected via a first communications network, and wherein the computing cluster is interconnected with the device that is external to the computing cluster via a second communications network.

18. The non-transitory computer-readable medium of claim 17, wherein the determining, by the first computing node, the status of the device that is external to the computing cluster comprises:
   determining that the first computing node cannot connect to the device that is external to the computing cluster when the first computing node is not connected to the second communications network.

19. The non-transitory computer-readable medium of claim 17, wherein the determining, by the first computing node, the status of the device that is external to the computing cluster comprises:
   determining that the first computing node cannot connect to the device that is external to the computing cluster when the first computing node is connected to the second communications network via a first subnet, and the device that is external to the computing cluster is connected to the second communications network via a second subnet.

20. The non-transitory computer-readable medium of claim 16, wherein the device that is external to the computing cluster comprises an antivirus server, and wherein the processing task comprises scanning a specified group of files.

* * * * *